(12) United States Patent
Jensen

(10) Patent No.: US 6,860,995 B2
(45) Date of Patent: Mar. 1, 2005

(54) PERIPHYTON FILTRATION PRE-AND POST-TREATMENT SYSTEM AND METHOD

(75) Inventor: Kyle R. Jensen, Apopka, FL (US)

(73) Assignee: AquaFiber Technologies Corporation, Winter Park, FL (US)

( * ) Notice: Subject to any disclaimer, the term of this patent is extended or adjusted under 35 U.S.C. 154(b) by 0 days.

(21) Appl. No.: 10/827,116

(22) Filed: Apr. 19, 2004

(65) Prior Publication Data

US 2004/0262219 A1 Dec. 30, 2004

Related U.S. Application Data

(63) Continuation of application No. 09/940,977, filed on Aug. 28, 2001, now Pat. No. 6,723,243.
(60) Provisional application No. 60/285,001, filed on Apr. 19, 2001.

(51) Int. Cl.[7] .............................. C02F 3/32; C02F 1/78; C02F 1/30
(52) U.S. Cl. ...................... 210/602; 210/631; 210/748; 210/170; 210/205; 210/259
(58) Field of Search ................................ 210/602, 631, 210/748, 760, 202, 205, 170, 259, 906

(56) References Cited

U.S. PATENT DOCUMENTS

| | | | |
|---|---|---|---|
| 3,794,582 A | 2/1974 | Lackme et al. |
| 4,141,830 A | 2/1979 | Last |
| 4,333,263 A | 6/1982 | Adey |
| 5,037,550 A | 8/1991 | Montagnon et al. |
| 5,078,881 A | 1/1992 | Augustine et al. |
| 5,131,820 A | 7/1992 | Jensen |
| 5,364,537 A | 11/1994 | Paillard |
| 5,389,257 A | 2/1995 | Todd et al. |
| 5,527,456 A | 6/1996 | Jensen |
| 5,573,669 A | 11/1996 | Jensen |
| 5,591,341 A | 1/1997 | Jensen |
| 5,846,423 A | 12/1998 | Jensen |
| 5,985,147 A | 11/1999 | Jensen et al. |

FOREIGN PATENT DOCUMENTS

| | | |
|---|---|---|
| JP | 2-83095 | 3/1990 |
| JP | 2-83097 | 3/1990 |
| JP | 3-270793 | 12/1991 |
| JP | 2000-117287 | 4/2000 |

OTHER PUBLICATIONS

*Ozone in Water Treatment Application and Engineering*, Cooperative Research Report, American Water Works Association and Compagnie Générale des Eaux, Lewis Publishers, 1991, pp. 31–79, 133–135, 154–157, 254, 273–298.

*Primary Examiner*—Fred G. Prince
(74) *Attorney, Agent, or Firm*—Allen, Dyer, Doppelt, Milbrath & Gilchrist, P.A.

(57) ABSTRACT

Periphyton filtration is a known method for performing bioremediation of polluted water, removing nutrients from the influent on which the attached algae thrive. The present system improves upon this method by adding a strong oxidizer to the influent, and, in some cases, to the effluent, to make organically bound nutrients available to a target culture of periphyton or aquatic plants to reduce the population of undesirable microinvertebrates, to make organically bound nutrients available to the periphyton, and to reduce the level of toxic compounds. A particular embodiment comprises ozonating the water. A pesticide may be added to control insect populations.

18 Claims, 2 Drawing Sheets

PERIPHYTON FILTRATION PRE-AND POST-TREATMENT SYSTEM AND METHOD

CROSS-REFERENCE TO RELATED APPLICATION

This application is a continuation of utility application Ser. No. 09/940,977, filed on Aug. 28, 2001, issued U.S. Pat. No. 6,723,243, entitled "Periphyton Filtration Pre- and Post-Treatment System and Method," which itself claims priority to provisional application 60/285,001, filed Apr. 19, 2001, "Periphyton Filtration Pretreatment System and Method," which are commonly owned with the present invention and which are incorporated herein by reference.

BACKGROUND OF THE INVENTION

1. Field of the Invention

The present invention relates to systems and method for improving water quality, and, more particularly, to such systems and methods for bioremediating water with an attached algal colony, and, most particularly, to treating water against undesired toxins, microorganisms, and other water-borne pollutants in concert with an attached algal colony.

2. Description of Related Art

Algae comprise a group of plants, existing in approximately 18,000 different species, whose primary nutrients include carbon, nitrogen, and phosphorus, as well as a suite of micronutrients essential to plant growth.

The removal of contaminants from wastewater and ground water has become an important problem in restoring ecological balance to polluted areas. It is known that some algal species are capable of absorbing heavy metals into their cell walls, thus reducing their toxic effects on the environment. Algae can also take up nutrients and micronutrients that may be present in overabundance, such as phosphorus, potassium, nitrogen, iron, aluminum, and calcium, and can thus be utilized to remediate an ecosystem. Such remediation can occur when water flows over stationary algae, also absorbing carbon dioxide and releasing oxygen in the process as a result of respiration and photosynthesis. Further, the water passing over the PF experiences an increase in pH owing to the removal of carbon. The filtration can occur through adsorption, absorption, physical trapping, and other more complex means.

A system used to effect this uptake is known as a periphyton filter, the periphyton comprising a culture of a family of fresh, brackish, and/or salt-water aquatic plants known as attached microalgae. Unlike such organisms as free-floating plankton, benthos or attached algae is stationary community of epiphytes that will grow on a wide variety of surfaces. When occurring in the path of flowing water, the stationary algae remove nutrients and other compounds from the passing water, while absorbing $CO_2$ and releasing $O_2$ as a result of respiration and photosynthesis. Once a colony is established, roots or holdfasts cover the culture surface. If the plant bodies are harvested, leaving the roots behind, the nutrients and other pollutants contained in the plant bodies are removed from the water, causing a natural filtration effect.

A further advantage to this technique is that the enriched algae can be harvested and used as fish or animal feed, which serves to return the nutrients to the food chain.

Periphyton filters (PF) have the potential for use in a variety of applications. For example, the turf can be used to replace biological or bacteriological filters in aquaria. As mentioned, natural periphyton can be used to remove nutrients and other contaminants from polluted waters. In addition, by harvesting the algal mass, various processes can be used to produce a biomass energy source such as methane or ethanol, fertilizer, a human or animal food additive or supplement, cosmetics, or pharmaceuticals.

The high productivity of the algae in a fibrous form has also yielded uses in the paper and paper products industry, as the harvested algae are stronger and easier to process than wood fiber. This capability has resulted in a sustainable method of managing human impact on aquatic ecosystems.

Periphyton filters behave differently in water with varying location, speciation, chemical characteristics, and other parameters. Experience in situ has in some cases resulted in weak or poor productivity owing to low concentrations of available nutrients. It has been shown that if a fraction of the primary nutrients are not available, then the periphyton filters struggle to develop the critical mass necessary to invoke a substantial precipitation and physical trapping capability and concurrent filtration characteristics. In particular, the presence of microinvertebrates and their eggs can compromise the success of a periphyton filtration system by consuming desirable periphyton and by eating the root or holdfast of the algal filament.

Toxic cyanobacteria pose a particularly formidable set of filtration challenges in that the toxins are very persistent in the environment and can exist both inside and outside the algal cell. It is known to treat toxin-containing water with ozone because of its strong oxidizing effect when mixed in water; however, the nutrients in ozonated water become available and are reconsumed by the toxic algae.

Studies in algal turf production are known in the art. Algal turf techniques have been disclosed in Adey's U.S. Pat. No. 4,333,263, and the present inventor's U.S. Pat. Nos. 5,131,820, 5,527,456, 5,573,669, 5,591,341, 5,846,423, and 5,985,147, the disclosures of which are incorporated herein by reference.

SUMMARY OF THE INVENTION

It is therefore an object of the present invention to provide a system and method for pretreating and/or post-treating water in concert with a periphyton filtration bed.

It is another object to provide such a system and method for reducing a population of undesirable microinvertebrates in a periphyton filtration bed.

It is an additional object to provide such a system and method for reducing or eliminating toxins from inflow water as well as a toxicity level of harvested algal mass.

These objects and others are attained with the system and method of the present invention. The system comprises means for adding a strong oxidizer to the influent, and, in some cases, to the effluent. A particular embodiment comprises ozonating the water.

The method of treating water comprises the steps of exposing water desired to be treated to ozone in sufficient quantity to reduce a concentration of undesired microorganisms therein and flowing the water over a colony of attached algae to remove undesired matter therefrom, such as, but not intended to be limited to, nutrients.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
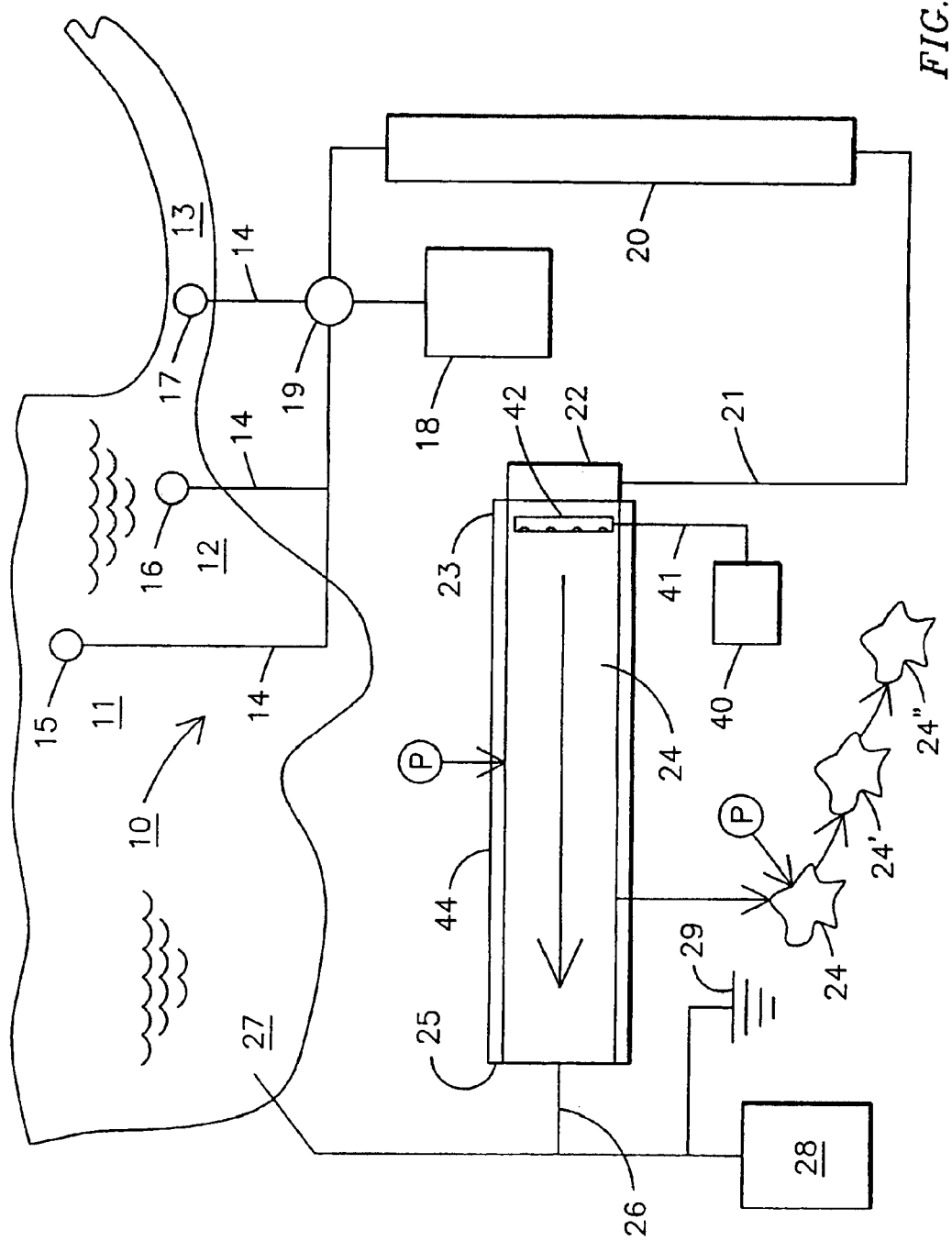
FIG. 1 is a schematic illustration of a first embodiment of the invention.
Figure 2:
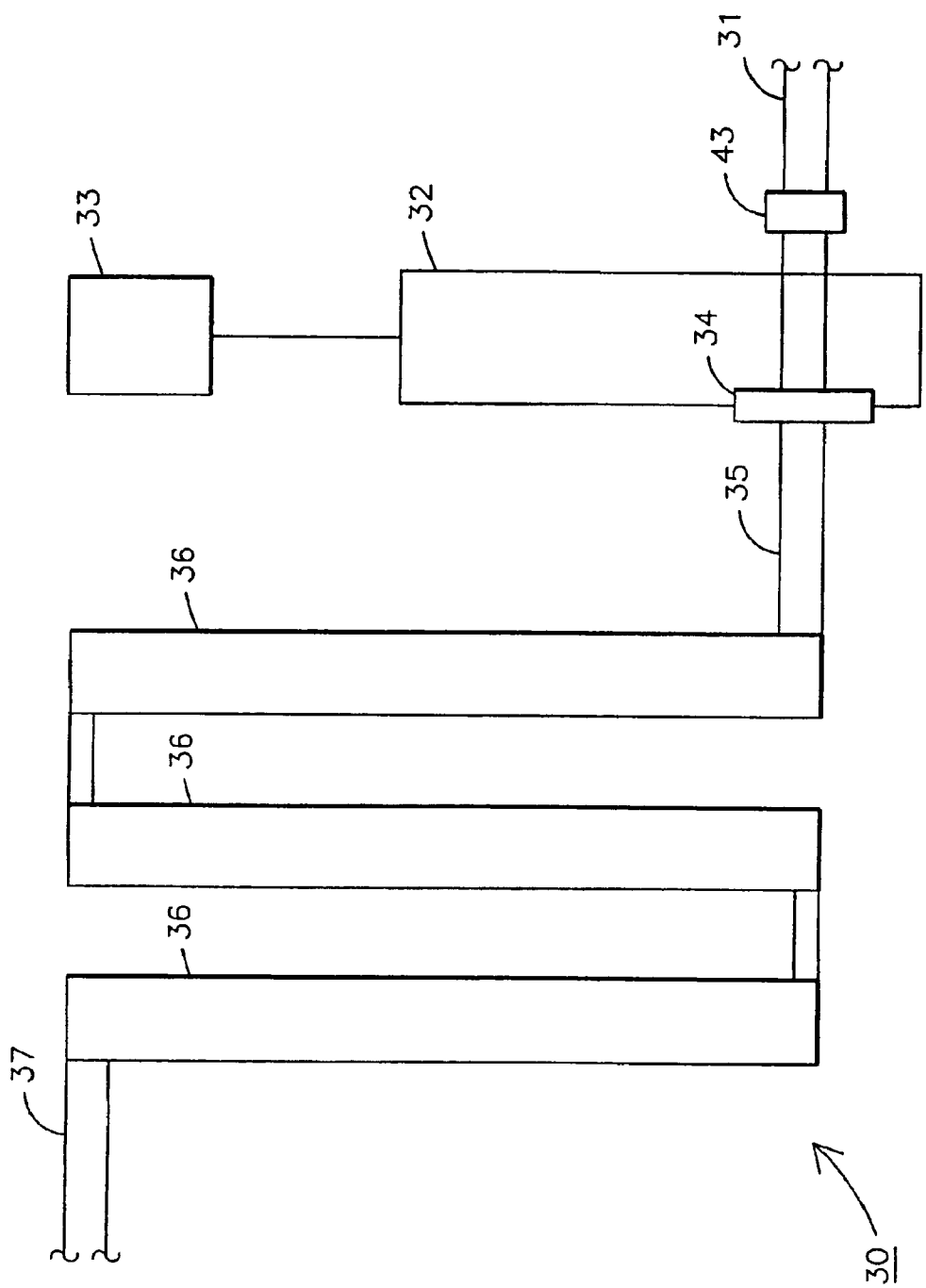
FIG. 2 is a schematic illustration of a second embodiment of the invention.

A description of the preferred embodiments of the present invention will now be presented with reference to FIGS. 1 and 2.

It is known to use ozone to treat water because of the properties of the unstable $O_3$ molecule, which is a strong oxidizer. Ozone is typically generated, for example, by ultraviolet radiation or corona discharge. Since ozone is a gas, it must be dissolved or broken into small bubbles to optimize contact with the target microorganisms in the influent and, in some cases, the effluent. An optimal residence time should be achieved in the water to be treated to maximize particle contact. This may be achieved, for example, with a mixing chamber or a mixing pump.

If the location of the periphyton filter is at some distance from the water to be treated, mixing may occur, for example, downstream and generally adjacent a supply pump or pipe entrance, with a single or multiple static mixers agitating the water/ozone combination. The residence time is then equal to the travel time to the periphyton filter, which can be tested for sufficiency of contact time. In addition, further static mixers and ozone injection points may be positioned along the pathway to the periphyton filter to increase effectiveness and efficiency.

In an alternate embodiment a covered pond may be used, such a pond cover having an ozone destruct port at the highest location to catch ozone prior to escaping into the atmosphere. A subsurface "well-style" tank may be used to increase contact time, such a tank having a high-pressure ozone injection at its bottom for optimal dispersion of ozone into the water column.

The present invention provides the following benefits:

Ozone breaks up planktonic algae, bacteria, and other organically bound particles in lake water, thereby making nutrients available for use and concurrent growth of the periphyton.

After the nutrients are available and removed by the periphyton, the water can be returned to the water body from which it came, or to another water body, in a state that will limit the ability of toxic algae to regrow, thereby effecting remediation.

Ozone destroys certain toxic compounds found in cyanobacteria (blue-green algae) recently found to be dangerous to humans and other animals. These toxic compounds, as well as nontoxic compounds, are then available to be taken up by filamentous algae grown for industrial use, such as in the paper products industry Ozone destroys both microinvertebrates and their eggs, which often settle, hatch, and grow as they consume desirable periphyton, thus reducing the effectiveness of filtration.

Other devices to be used alone or in conjunction with ozone to enhance performance are plasma sparkers and ultraviolet light treatment systems, such as are known in the art.

Two embodiments of the present invention are illustrated schematically in FIGS. 1 and 2. In the first embodiment (FIG. 1) of the system 10 water is shown being taken in from deep water 11, shallow water 12, or a tributary 13 by way of pipes 14 and pumps 15–17, respectively. An ozone generator 18 provides ozone to an ozone injection apparatus 19 so that the water desired to be treated can be contacted with ozone in chamber 20. Alternately, as mentioned above, a submersible plasma sparker may be used. Ozonated water is carried via transfer piping 21 to a distribution manifold 22, which distributes the water to the inlet end 23 of a periphyton bed 24, which is tilted to permit the water to flow downward to the outlet end 25. The treated water is then collected into a transfer pipe system 26, and is then either returned to a waterway 27 or transferred to a drinking water treatment system 28 of ground water aquifers 29.

In the second embodiment (FIG. 2) of the system 30, inflowing water 31 is pumped into ozone distribution piping 32, into which is also injected ozone from an ozone generator 33. Prior to exposure to ozone, the water may be exposed to at least one of ultraviolet radiation and acoustic energy 43. Following passage through an ozone injection diffuser 34, the water proceeds via transfer piping 35 into multiple ozone contact chambers 36. Three are shown here, but this is not intended as a limitation. When fully ozonated, the water exits via discharge piping 37.

In either of the above-described embodiments, an additional step may be taken of adding a pesticide to the algal colony for controlling insects. The pesticide may be selected, for example, from a group consisting of an insecticide, a pyrethroid, or a natural pyrethrum, although these are not intended as limitations.

In a particular embodiment, the pesticide may comprise *bacillus therengensus isralioans* (STI). A further element of either of the systems 10,30, shown in FIG. 1, comprises a BTI culturing system 40, wherein BTI is substantially continuously cultured, or cultured as needed, and a continuous drip of BTI is provided via line 41 leading to drip hose 42 adjacent the inlet 23 of the periphyton bed 24.

As an additional or alternative embodiment, further systems and methods are envisioned for detoxifying one or more elements of the system 10,30. As an example (FIG. 1), the algal colony 24 may be harvested by means known in the art from its base 44, and a pesticide P may be added to the harvested algae to form a mixture 24'. This mixture 24' is exposed to sunlight or other means to provide detoxification and then ground to form a mulch 24". Such a mulch may then be used atop the base 44 to form a subsequent algal colony 24. The pesticide may be selected from a group consisting of natural pyrethrum, natural pepper, garlic, elder, and lemon sage, although these are not intended as limitations.

Further, the algal colony 24 may be harvested by means known in the art, and pesticide P may be added to the base 44 wherein water is not flowing, and allowed to detoxify the base 44. Following sufficient time for detoxification, an agonist may be added, such as an alkaline solution, to detoxify the pesticide prior to restarting water flow over the algal colony 24. In this case, the pesticide may comprise at least one of a synthetic pyrethroid or a natural pyrethrum.

It may be appreciated by one skilled in the art that additional embodiments may be contemplated, including alternate methods of introducing ozone and the use of alternate oxidizing agents to the treatment water.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method of treating water comprising the steps of:
   exposing water desired to be treated to ozone in sufficient quantity to reduce a concentration of undesired microorganisms therein;
   flowing the water over a colony of attached algae to remove undesired matter therefrom;
   stopping the water flow;
   harvesting the algal colony, leaving a colony base;
   adding a pesticide to the colony base to detoxify the colony base;
   permitting the pesticide to achieve substantial detoxification; and
   detoxifying the pesticide.

2. A method of treating water comprising the steps of:
   exposing water desired to be treated to ozone in sufficient quantity to oxidize nutrients therein to a form amenable to bioassimilation by a colony of attached algae, the ozone in a form for optimizing contact with components in the water; and
   flowing the water over a floway comprising attached algae to remove the oxidized nutrients therefrom, the algae experiencing an enhanced photosynthetic activity upon bioassimilation of the oxidized nutrients.

3. The method recited in claim 2, further comprising the steps of:
   generating ozone gas; and
   dissolving the ozone in the water to achieve optimization of contact with the water components.

4. The method recited in claim 2, further comprising the steps of:
   generating ozone gas; and
   breaking the ozone into small bubbles to achieve optimization of contact with the water components.

5. The method recited in claim 2, wherein the exposing step comprises one of mixing the ozone and the water in a mixing chamber and using a mixing pump to mix the ozone and the water.

6. The method recited in claim 2, wherein the exposing step comprises mixing ozone into water to be treated in a covered enclosure, and further comprising the step of preventing unassimilated ozone from escaping from the enclosure.

7. The method recited in claim 2, wherein the exposing step comprises mixing ozone into water in a subsurface tank using a high-pressure injector.

8. A method of increasing an effectiveness of a floway comprising a colony of attached algae comprising the steps of:
   exposing water desired to be treated to ozone in sufficient quantity to destroy periphyton-consuming microinvertebrates and eggs thereof;
   flowing the water over the floway to remove undesired microorganisms therein, the algae effectiveness improved in the absence of the periphyton-consuming microinvertebrates and eggs thereof.

9. A method of treating water comprising the steps of:
   exposing water desired to be treated to ozone in sufficient quantity to oxidize nutrients therein to a form amenable to bioassimilation by a colony of attached algae, the ozone in a form for optimizing contact with components in the water;
   flowing the water over a floway comprising attached algae to remove the oxidized nutrients therefrom; and
   exposing water exiting the floway to ozone in sufficient quantity to further purify the water.

10. A system of treating water comprising:
    an ozone generator;
    a mixing chamber for exposing water desired to be treated to ozone in sufficient quantity to reduce a concentration of undesired microorganisms therein;
    means for channeling the water to be treated into the mixing chamber and for introducing the generated ozone into water in the mixing chamber;
    a colony of attached algae adapted to remove undesired matter from the ozonated water;
    means for channeling ozonated water from the mixing chamber to the algal colony;
    a harvester for harvesting the algal colony, leaving a colony base; and
    means for adding a pesticide to the colony base to detoxify the colony base.

11. A system of treating water comprising:
    an ozone generator;
    a mixing chamber for exposing water desired to be treated to ozone in sufficient quantity to oxidize nutrients therein to a form amenable to bioassimilation by a colony of attached algae, the ozone in a form for optimizing contact with components in the water;
    means for channeling water to be treated into the mixing chamber and for introducing generated ozone into the water to be treated in the mixing chamber;
    a floway comprising attached algae adapted to remove the oxidized nutrients therefrom, the algae experiencing an enhanced photosynthetic activity upon bioassimilation of the oxidized nutrients; and
    means for channeling ozonated water from the mixing chamber onto the floway.

12. The system recited in claim 11, further comprising means for dissolving the ozone in the water to achieve optimization of contact with the water components.

13. The system recited in claim 11, further comprising means for breaking the ozone into small bubbles to achieve optimization of contact with the water components.

14. The system recited in claim 11, wherein the mixing chamber comprises a covered enclosure, and further comprising means for preventing unassimilated ozone from escaping from the enclosure.

15. The system recited in claim 11, wherein the mixing chamber comprises a subsurface tank, and further comprising a high-pressure injector positioned to inject generated ozone into water to be treated in the subsurface tank.

16. The system recited in claim 11, further comprising:
    a second mixing chamber for exposing water exiting the floway to ozone is sufficient quantity to further purify the water; and
    means for channeling water from the floway to the second mixing chamber.

17. A system of increasing an effectiveness of a floway comprising a colony of attached algae comprising the steps of:
    an ozone generator;
    a mixing chamber for exposing water desired to be treated to generated ozone in sufficient quantity to destroy periphyton-consuming microinvertebrates and eggs thereof;

means for channeling water to be treated into the mixing chamber and for injecting generated ozone into the water to be treated;

a floway to remove undesired microorganisms therein, the algae effectiveness: improved in the absence of the periphyton-consuming microinvertebrates and eggs thereof; and means for channeling ozonated water from the mixing chamber onto the floway.

18. The system recited in claim 17, further comprising:

a second mixing chamber for exposing water exiting the floway to ozone is sufficient quantity to further purify the water; and means for channeling water from the floway to the second mixing chamber.

* * * * *